June 19, 1928.
A. J. ALLARD
1,674,494
ATTACHMENT FOR VEHICLE DIRECTION INDICATORS
Filed Oct. 11, 1927
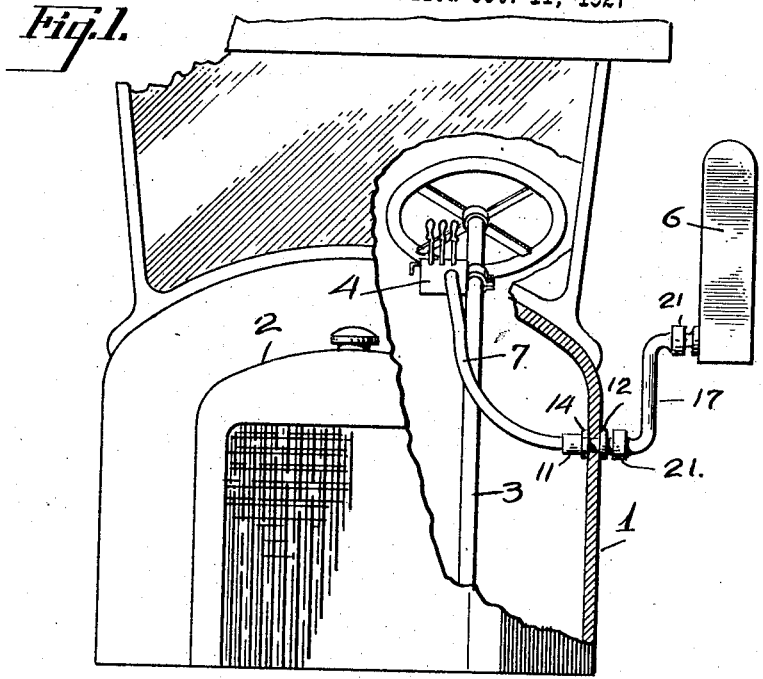
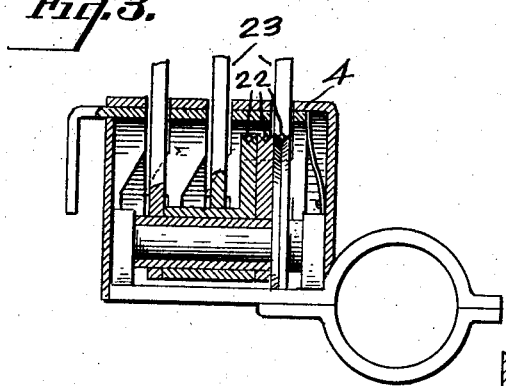
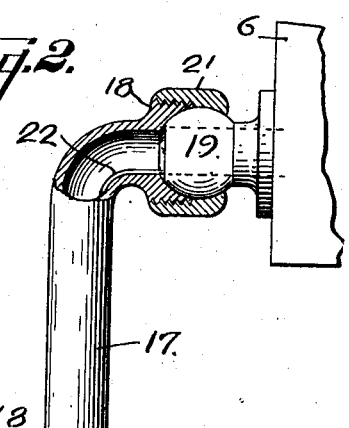
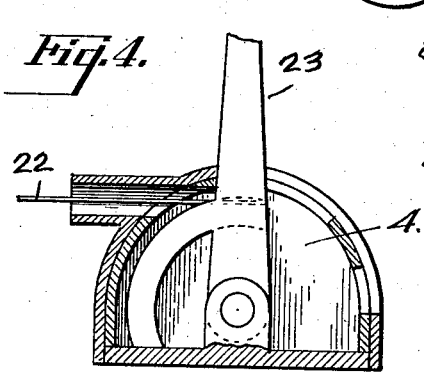
INVENTOR.
ALFRED J. ALLARD.
By Arthur L. Slee
ATTY.

Patented June 19, 1928.

1,674,494

UNITED STATES PATENT OFFICE.

ALFRED J. ALLARD, OF ELDRIDGE, CALIFORNIA.

ATTACHMENT FOR VEHICLE-DIRECTION INDICATORS.

Application filed October 11, 1927. Serial No. 225,521.

My invention relates to improvements in vehicle direction indicator attachments wherein a universally adjustable tubular member and bracket operate in conjunction with a plurality of signaling members and actuating means therefor, to conduct connections between said actuating means and signaling members and also to adjust the position of the signaling members relatively to the body of a motor vehicle.

The primary object of the present invention is to provide a new and improved adjustable connecting means between signaling members and actuating means therefor, of the type set forth in United States Letters Patent No. 1,638,429, issued to me on the 9th day of August, 1927, reference to which patent is hereby made, for a full comprehension of the operation and construction of said signaling members and actuating means therefor.

Another object of the present invention is to provide a new and improved attachment for the type of direction indicator referred to, whereby the position of a plurality of signaling members may be adjusted relatively to the body of a motor vehicle.

I accomplish these and other objects by means of the device disclosed in the drawings forming a part of the present application, wherein like characters of reference are used to designate similar parts throughout the specification and drawings, and in which—

Fig. 1 is a broken front elevation of a motor vehicle, disclosing my improved attachment applied thereto;

Fig. 2 is an enlarged elevation, partly in section, disclosing the manner in which the adjustable portion of the attachment is connected to the motor vehicle body and signaling member housing;

Fig. 3 is a longitudinal vertical sectional view disclosing the general arrangement of the actuating means; and Fig. 4 is a transverse vertical sectional view of the same.

Referring to the drawings, the numeral 1 is used to designate in general the cowl portion of a motor vehicle 2. The steering column 3 of said vehicle 1 has mounted thereon the actuating means 4 for the signaling members within the housing 6 therefor which signaling members and housing are fully disclosed in my previous patent hereinbefore referred to, and forming no part of the present invention, will not herein be described beyond the illustration of the signaling member housing 6.

The present invention consists of an attachment for conducting connecting means from the actuating means or housing 4 to the signaling member housing 6 regardless of the relative position of said housing 6 to the vehicle 1.

The attachment comprises a tubular member 7 having one end thereof suitably connected to the housing 4 and its other end provided with a universal connection in the form of a ball and socket joint.

The said other end of the tube may be connected to the threaded stem 8 of a ball 9 by means of a nipple 11, as disclosed in Fig. 1 of the drawings. The stem 8 is also provided with an annular flange 12 and a suitable nut 14 by means of which the said flange 12 may be tightly drawn against the side of the motor vehicle body 1, preferably the cowl, by said nut 14 when said stem has been inserted through a suitable hole or aperture 16 in the side of said body 1, as disclosed in Figs. 1 and 2 of the drawings.

A goose-neck bracket 17 is provided at both ends with ball engaging joints 18 for universally engaging the ball 9 rigidly connected to the side of the body 1 and a similar ball 19 secured to the side of the signaling member housing 6. The usual threaded collar 21 is provided on both joints 18 whereby the engagement of the joints with their respective balls may be tightened after the bracket or goose-neck 17 is adjusted to the proper position.

The balls 9 and 19 as well as the goose-neck bracket 17 are hollow in order to conduct, and at the same time protect, suitable connecting means or wires 22 which wires 22 are connected at one end to the operating levers 23 of the actuating housing 4 and also to their respective signaling members, not shown, within the signaling member housing 6.

In operation, the collars 21 are loosened and the hollow bracket 17 is adjusted to adjust the position of the signaling member housing 6 to the required position, after which said collars 21 are tightened to tightly or rigidly engage their respective balls 9 and 19 and thereby hold the housing 6 in the required position.

The connections 22 between the actuating means and the signaling members are then properly housed to any position of the housing 6 relatively to the body 1.

Having thus described my invention what I claim as new and desire to secure by Letters Patent is—

1. The combination, with a motor vehicle direction indicator comprising a housing containing a plurality of signaling members, and actuating means for said members mounted upon the steering column of the vehicle, of a tubular member connected to said actuating means and extending through one side of the body of a vehicle and provided with an adjustable section on the outside of said body and having universal joints at both ends thereof connected to the tubular member and to said signaling member housing, whereby connecting means may be conducted from said actuating means through said tubular member to said signaling members, and also whereby the position of said signaling member housing relatively to the side of the vehicle body may be adjusted.

2. The combination, with a motor vehicle direction indicator comprising a plurality of signaling members and actuating means therefor of a tubular member having one end connected with said actuating means and the other end extending exteriorly of the body of a vehicle and provided with a universal joint; and a tubular bracket universally connected with said universal joint and also universally connected to said signaling members whereby connecting means may be conducted between said actuating means and the signaling members by said tubular member and bracket and also whereby the position of said signaling means may be adjusted transversely and longitudinally relatively to the body of a vehicle.

3. The combination with a motor vehicle direction indicator comprising a plurality of signalling members and actuating means therefor, of a tubular member having one end connected with said actuating means and the other end extending exteriorly of the body of a vehicle and provided with a universal ball joint; a universal ball joint mounted in connection with the signal members; and a tubular bracket having its ends turned to substantially right angles to the body of the bracket in transversely opposite directions and provided with universal ball joint socket portions, said socket portions being arranged to receive the ball joint portions of the tubular member and the signal members to form universal joints at both ends of the bracket whereby the signalling means and the bracket may be adjusted transversely and longitudinally relatively to the body of the vehicle and the signalling means adjusted relative to the bracket.

In witness whereof, I hereunto set my signature.

ALFRED J. ALLARD.